US009614273B1

(12) United States Patent
Sena

(10) Patent No.: US 9,614,273 B1
(45) Date of Patent: Apr. 4, 2017

(54) OMNIDIRECTIONAL ANTENNA HAVING CONSTANT PHASE

(71) Applicant: Sandia Corporation, Albuquerque, NM (US)

(72) Inventor: Matthew Sena, Los Lunas, NM (US)

(73) Assignee: Sandia Corporation, Albuquerque, NM (US)

(*) Notice: Subject to any disclaimer, the term of this patent is extended or adjusted under 35 U.S.C. 154(b) by 118 days.

(21) Appl. No.: 14/829,852

(22) Filed: Aug. 19, 2015

(51) Int. Cl.

| | |
|---|---|
| ***H01Q 13/00*** | (2006.01) |
| ***H01Q 1/36*** | (2006.01) |
| ***H01Q 1/48*** | (2006.01) |
| ***H01Q 1/50*** | (2006.01) |
| ***G01S 19/13*** | (2010.01) |

(52) U.S. Cl.
CPC ............... *H01Q 1/36* (2013.01); *G01S 19/13* (2013.01); *H01Q 1/48* (2013.01); *H01Q 1/50* (2013.01)

(58) Field of Classification Search
CPC .................................. H01Q 9/28; H01Q 9/40
USPC .......................... 343/700 MS, 773, 829, 846
See application file for complete search history.

(56) References Cited

U.S. PATENT DOCUMENTS

| | | | | |
|---|---|---|---|---|
| 3,987,456 A * | 10/1976 | Gelin | H01Q 1/38 | 343/773 |
| 4,074,268 A * | 2/1978 | Olson | H01Q 3/28 | 342/399 |
| 4,389,651 A * | 6/1983 | Tomasky | H01Q 1/08 | 343/794 |
| 6,967,626 B2 * | 11/2005 | Apostolos | H01Q 1/08 | 343/773 |
| 7,286,094 B2 * | 10/2007 | Ratni | H01Q 9/28 | 343/772 |
| 7,557,756 B2 * | 7/2009 | Iwata | H01Q 9/40 | 343/700 MS |
| 9,209,526 B2 * | 12/2015 | Gao | H01Q 9/26 | |

OTHER PUBLICATIONS

Reddy, et al., "High Gain and Low Cross-Polar Compact Printed Elliptical Monopole UWB Antenna Loaded with Partial Ground and Parasitic Patches", Progress in Electromagnetics Research B, vol. 43, pp. 151-167, 2012.
Moreira, et al., "GO Shaping of Omnidirectional Dual-Reflector Antennas for a Prescribed Equi-Phase Aperture Field Distribution", IEEE Transactions on Antennas and Propagation, vol. 55, No. 1, 2007.
Chu, L. J., "Physical Limitations of Omnidirectional Antennas", Massachusetts Institute of Technology, Technical Report No. 64, pp. 1-26, 1948.

* cited by examiner

*Primary Examiner* — Tho G Phan
(74) *Attorney, Agent, or Firm* — Medley, Behrens & Lewis, LLC

(57) ABSTRACT

Various technologies presented herein relate to constructing and/or operating an antenna having an omnidirectional electrical field of constant phase. The antenna comprises an upper plate made up of multiple conductive rings, a lower ground-plane plate, a plurality of grounding posts, a conical feed, and a radio frequency (RF) feed connector. The upper plate has a multi-ring configuration comprising a large outer ring and several smaller rings of equal size located within the outer ring. The large outer ring and the four smaller rings have the same cross-section. The grounding posts ground the upper plate to the lower plate while maintaining a required spacing/parallelism therebetween.

20 Claims, 5 Drawing Sheets

OMNIDIRECTIONAL ANTENNA HAVING CONSTANT PHASE

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

Detection of a position and direction of motion of an object, such as a vehicle, can be provided by navigation technologies such as the Global Positioning System (GPS), the Global Navigation Satellite System (GLONASS), the Galileo system, etc. Such navigation technologies are space-based satellite navigation systems that provide location and time information anywhere on or near Earth as a function of an unobstructed view to a plurality of positioning satellites.

A number of antenna configurations are available to receive navigation signaling; however, conventional antenna configurations can require rather limited operating conditions and accordingly may not be amenable to operation with vehicles that are travelling with a high velocity, experiencing elevated temperatures, etc.

SUMMARY

The following is a brief summary of subject matter that is described in greater detail herein. This summary is not intended to be limiting as to the scope of the claims.

Described herein are various technologies related to constructing and/or operating an antenna for utilization on a vehicle that is travelling at high velocity and/or experiencing extreme environmental conditions, e.g., high temperatures. The antenna, which is referred to herein as a metal rings antenna or a multi-ring antenna (MRA), can have a low profile (e.g., <0.1 wavelength thick), and is designed to receive accurate GPS satellite positioning information.

The antenna can comprise an upper plate made up of multiple conductive rings, a lower ground-plane plate, a plurality of stand-off grounding posts, a conical feed, and a radio frequency (RF) feed connector. The upper plate can have a five-ring configuration comprising a large outer ring and four smaller rings of equal size located within the outer ring. The large outer ring and the four smaller rings can have the same cross-sectional profile (e.g., square, round, rectangular, etc.). In an embodiment, the larger ring can be twice the diameter of the smaller rings and defines the outer diameter of the upper plate. The smaller rings can be located inside the larger ring with the centers of the smaller rings being 90 degrees from each other at a distance of half the radius of the larger ring from its center.

The antenna can further comprise four stand-off grounding posts positioned at the perimeter of the larger ring, one post at each intersection of the smaller rings to the larger ring. The posts act to ground the upper plate to the lower plate while maintaining a spacing (or gap) between the upper plate and the lower plate. The conical feed can be a conical section that is attached at its largest diameter (e.g., its base) to the center region of the upper plate while leaving a gap between the smallest diameter of the cone (e.g., its apex) and the lower plate. For example, the gap between the apex of the cone and the lower plate can be approximately 0.05 inches.

The lower plate can be a solid circular plate with an outer diameter equal to or larger than the upper plate. At the center of the lower plate is a hole (e.g., 0.160 inch diameter) to allow for an insulator of the RF feed connector to be located therein. The RF feed connector mounts to the hole (e.g., at an external surface of the lower plate). The insulator and center conductor of the RF feed connector can protrude through the hole of the lower plate and touch the bottom smaller diameter (e.g., apex) of the conical feed. The center conductor of the RF feed can be longer than the insulator, and can be connected to the conical feed by any suitable means, e.g., brazing.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
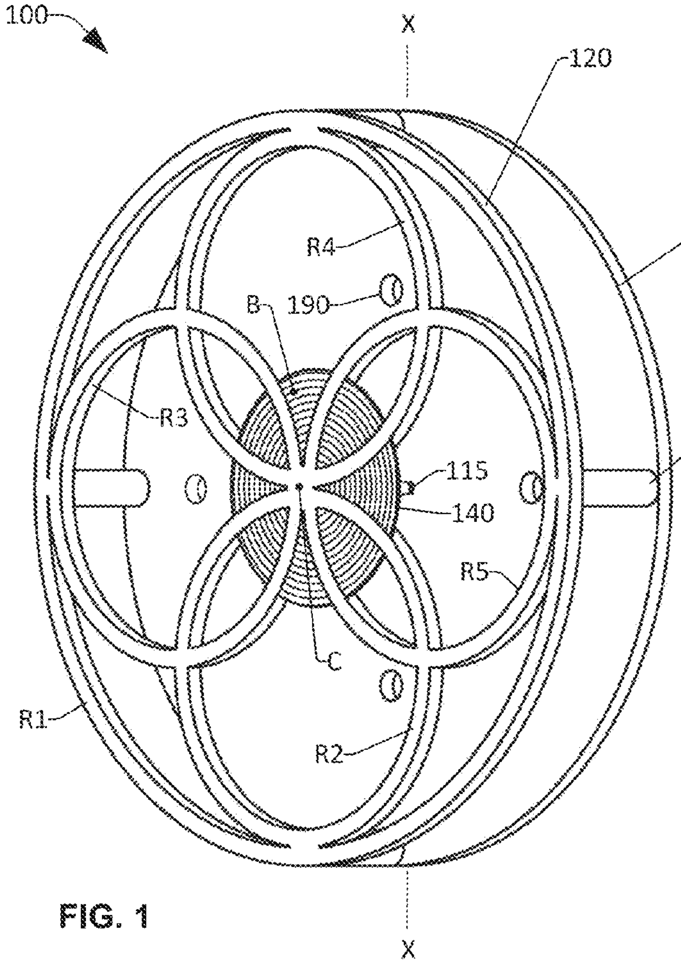
FIG. 1 is a schematic illustrating an exemplary ring antenna.

Various technologies are presented herein pertaining to an omnidirectional antenna having constant phase, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Further, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

Various embodiments presented herein relate to an antenna which can maintain constant phase while it is being spun (rotated) about its axis. The antenna has a relatively small profile (e.g., having a thickness of less than 0.1 times the wavelength of a signal to be detected or emitted by the antenna). The antenna can be utilized in any suitable application; one such example application is as an antenna in a global positioning system. For example, the antenna can be attached to a vehicle traveling with a high velocity (e.g., hypersonic) and a determination of the vehicle's location is required, e.g., by GPS signaling. A function of traveling at such high velocities is the vehicle can undergo and/or experience such environmental conditions as a high degree of heating.

Figure 2:
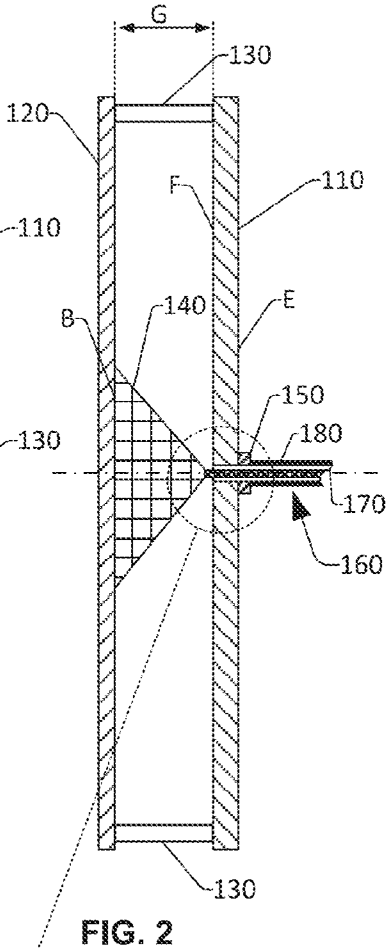
FIG. 2 is a sectional view through the ring antenna.
Figure 3:
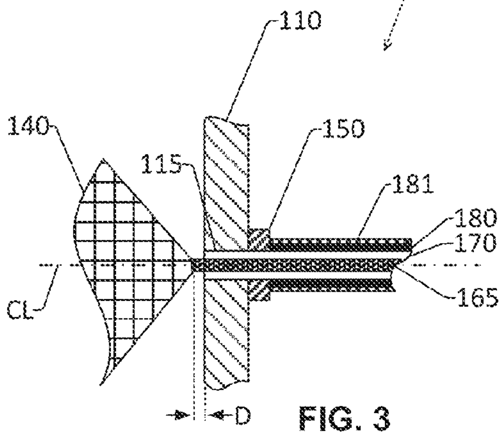
FIG. 3 is a close-up view of a RF connector and a conductive cone included in the ring antenna.

FIGS. 1, 2, and 3 illustrate an exemplary antenna 100, which may be referred to herein as a metal rings antenna or a multi-ring antenna (MRA), a ring antenna, or a metal ring antenna. The antenna 100 comprises an arrangement of conductive rings, where FIG. 1 is an isometric view (e.g., a three dimensional (3D) representation), FIG. 2 is a sectional view along the X-X axis of FIG. 1, and FIG. 3 is a zoomed portion of FIG. 2. Antenna 100 comprises a lower plate 110 and an upper plate 120, wherein the lower plate 110 (a bottom plate) and the upper plate 120 (a top plate) are arranged (aligned) to be parallel to each other. As shown in FIGS. 1 and 3, the lower plate 110 has a hole 115 that extends through the lower plate 110 from an external surface E of the lower plate 110 to an inner surface F of the lower plate 110, wherein the inner surface F of the lower plate 110 faces the upper plate 120. In an example, the hole 115 can be located at the center of the lower plate 110. The lower plate 110 can be a solid circular plate with an outer diameter that is equal to or larger than the diameter of the upper plate 120.

The antenna further includes a plurality of posts 130 that connect the lower plate 110 and the upper plate 120, and further maintain a separation distance between the lower plate 110 and the upper plate 120, e.g., separation distance G shown in FIG. 2.

The antenna 100 further comprises a cone 140 which is attached to the upper plate 120. The cone 140 is of such size and position that the base, B, of the cone 140 is attached to the upper plate 120 and the apex, A, of the cone 140 is located a distance D above the hole 115. While not shown, the cone 140 can be attached to the center region C of the upper plate by screws, or other suitable mechanical assembly.

A connector 150 enables connection of the antenna 100 to an external system, wherein the external system can be a positioning and/or navigation system, such as a GPS system. The antenna 100 can be connected to the external system by a conductive cable 160, transmission line, etc. For instance, the cable can be a coaxial (coax) cable 160, wherein the coax cable 160 can include a core conductor 165, an insulating layer 170 (e.g., tubular) shrouding the conductor 165, and a conductive shield 180 (e.g., tubular) surrounding the insulating layer 170. The coax cable 160 can further comprise a protective jacket layer 181 which encapsulates the conductive shield 180. The coax cable 160 can be configured to enable a radio frequency (RF) signal to be supplied to the antenna system 100, e.g., supplied from a GPS receiver to the cone 140 via the core conductor 165. Additionally or alternatively, the coax cable 160 can be configured to enable an RF signal captured by the antenna 100 to be supplied to a receiver.

The connector 150 can be configured such that the core 165 of the coax cable 160 extends through the hole 115 to connect at the apex A of the cone 140. Further, the insulating layer 170 can be utilized to prevent the core 165 from touching an inner surface of the hole 115, and, accordingly, prevent the core 165 from touching the lower plate 110. The connector 150 can be further configured to connect the conductive shield 180 to the lower plate 110. Hence, during operation of the antenna 100, the lower plate 110 can act as a ground plate, while the upper plate 120 can act as an electrically active plate, e.g., a radiator. In an example, the hole 115 can have a diameter of about 0.160 inches to enable location of the insulating layer 170 in the hole 15.

As shown in FIG. 1, the upper plate 120 can comprise a plurality of shapes, wherein the respective size, number and/or arrangement of the plurality of the shapes can be configured to enable a constant signal phase to be generated across the antenna 100 during operation of the antenna 100 (e.g., while the antenna 100 is electrically excited). As previously mentioned, the antenna 100 can be located on a vehicle travelling at high velocity. To enable a vehicle travelling at such a high velocity to travel with stable flight and maintain a required direction (course, flight path, etc.), the vehicle can have an aerodynamic profile and further, the vehicle can be spinning about its direction of travel (e.g., to provide gyroscopic stability).

The antenna 100 can be attached to the vehicle by any suitable connection mechanism, e.g., the antenna 100 can be attached by bolting in conjunction with a plurality of attachment holes 190. Accordingly, as the vehicle undergoes rotation during flight, the antenna 100 also undergoes rotation. Owing to configuration of the antenna 100, as the antenna 100 rotates, an electrical field having constant phase is engendered about the antenna 100 in an omnidirectional manner. Hence, the constant phase electrical field about the antenna 100 enables the antenna 100 to receive GPS signaling from one or more transmitters (e.g., satellite-based systems) remotely located from the antenna 100.

As shown in FIG. 1, an exemplary configuration is depicted, wherein the upper plate 120 comprises an outer ring R1 and four smaller rings R2-R5 included therein. The rings R2-R5 can be arranged in a "cross" arrangement, such that the rings R2-R5 are equally distributed about the centerpoint C of the larger outer ring R1. As shown in FIGS. 1-3, the centerpoint C of the outer ring R1 is aligned with the centerline CL of the hole 115. Hence, during rotation of the antenna 100 (e.g., as a function of rotation of the vehicle carrying the antenna 100), the upper plate 120 is configured to have an effective rotation about the CL. The outer ring R1 and the four smaller rings R2-R5 can have the same cross-section (e.g., square, round, hexagonal, etc.), and further be constrained to a common plane. In an example, the outer ring R1 can have a diameter twice a diameter of the smaller rings R2-R5, wherein ring R1 can define an outer diameter of the upper plate 120. Per the configuration presented in FIG. 1, the smaller rings R2-R5 can be located inside the ring R1, wherein the respective centers of rings R2-R5 are positioned 90° from each other with respect to the center C, and further are respectively positioned at a distance of half the radius of the ring R5 from its center C.

During excitation of the antenna 100, an electrical field can be generated in the upper plate 120, and further conveyed by the plurality of posts 130 from the upper plate 120 to the lower (ground) plate 110. Hence, owing to the arrangement of the rings R1-R5 and the spinning of the antenna 100, the electric field around the antenna 100 effectively has a constant phase. Hence, as a signal (e.g., from an external GPS satellite) is incident upon the antenna 100, the incident signal can cause a voltage or potential field between plates 110 and 120, causing an electric current to be generated on the antenna 100. Owing to the arrangement of the rings R2-R5 relative to the ring R1, a current applied to the cone 140 is equally distributed throughout the upper plate 120, e.g., equally over all surfaces of the upper plate 120. When the current reaches the outer edge of the upper plate 120 (e.g., reaches the outer edge of the ring R1) the current field can connect to the lower plate 110, thereby creating an electric field across the entirety of the antenna 100.

A plurality of factors and/or requirements can affect one or more parameters of the antenna 100. For example, the separation distance G can be a function of a desired bandwidth, wherein the greater the distance G, the greater an operating bandwidth of the antenna 100. For instance, the antenna 100 can be configured such that it is able to operate with two or more frequencies. For example, antenna system 100 can be configured to operate with one or more GPS frequencies, such as L1 frequency (e.g., 1575.42 MHz), L2 frequency (e.g., 1227.60 MHz), etc. By configuring the antenna 100 to operate with both L1 and L2 frequencies, the antenna 100 can be utilized with a GPS receiver that uses both L1 and L2 frequencies, thereby enabling a higher degree of positional determination than can be achieved with a GPS receiver that only operates at the L1 frequency.

In an exemplary embodiment, the outer ring R1 (and accordingly, the upper plate 120) can have a diameter of about 5 inches. Further, the separation distance G can be about a ¼ inch. Furthermore, the distance D between the apex A of the cone 140 and the opening of the hole 115 (e.g., surface F) can be about 0.05 inches (50 thousandths of an inch). The antenna system 100 can have a low profile, for example, a thickness of <about 0.1 times a wavelength of a signal that the antenna 100 is configured to detect and/or transmit. It is to be appreciated that the antenna 100, and the various components of the antenna 100, can be of any dimension suitable for operation of the antenna 100 to detect a signal(s) having a particular wavelength(s), frequency (ies), bandwidth(s), etc.

In another example, the lower plate 110, the upper plate 120, the plurality of posts 130, the connector 150, the core 165 and/or the shield 180 can be formed from a conductive material such as aluminum, copper, gold, silver, graphene, a plated material such as gold-plated aluminum, etc. The insulating layer 170 can be formed from any suitable insulator, such as polytetrafluoroethylene (PTFE, or Teflon). Material selection can be a function of a desired impedance with which the antenna 100 is to operate. For example, the antenna 100 can be configured to operate with a particular impedance, e.g., an impedance of 50 ohms (Ω).

In an example, the upper plate 120 can be formed from a single plate of material, with the respective shapes of the outer ring R1 and inner rings R2-R5 being formed by any suitable material removal technique such as machining (e.g., milling, drilling, etc.), electrical discharge machining (EDM), wire-EDM, etc. In another example, the upper plate 120 can be formed by a near-net shape formation process such as casting, investment casting, forging, etc., with subsequent machining as required. In a further example, the upper plate 120 can be formed from a plurality of separate components, wherein, for example, the rings R1-R5 can be separate pieces (e.g., separate rings) which can be joined by any suitable process such as welding, soldering, brazing, mechanical fixture, etc.

Further, the space or gap G between the lower plate 110 and the upper plate 120 can be an air-filled volume. In another example, the space G can be filled with a suitable material, where such material can include an insulator, etc.

It is to be appreciated that while the antenna 100 is illustrated with the upper plate 120 comprising an outer ring R1 and four inner rings R2-R5, other configurations are contemplated. For example, the number of inner rings can be less than or more than the four rings R2-R5 depicted in FIG. 1. Other shapes and arrangements for the upper plate 120 can include a Steiner chain arrangement, a trefoil arrangement, a Borromean arrangement, a vesica piscis arrangement, a Celtic four arrangement, a serpent knot, a Celtic round, as well as rings or circles, other shapes can be utilized, such as any number and arrangement of polygons, a icosahedral arrangement, an arrangement of spoke-like structures or arms radiating from the center C to the outer ring R1, etc.

Further, the antenna 100 can be manufactured by incorporating the antenna 100 into a printed circuit board (PCB). For example, the lower plate 110 (e.g., a ground layer) can be formed on a first plane in the PCB, and the upper plate 120 (e.g., an active layer) can be formed on a second plane in the PCB, with the cone 140 (e.g., a feed network) located in a manner to replicate the operation and/or structure of the antenna 100. A connector can be incorporated into the PCB assembly to enable connection to a transmitter or receiver.

Figure 4:
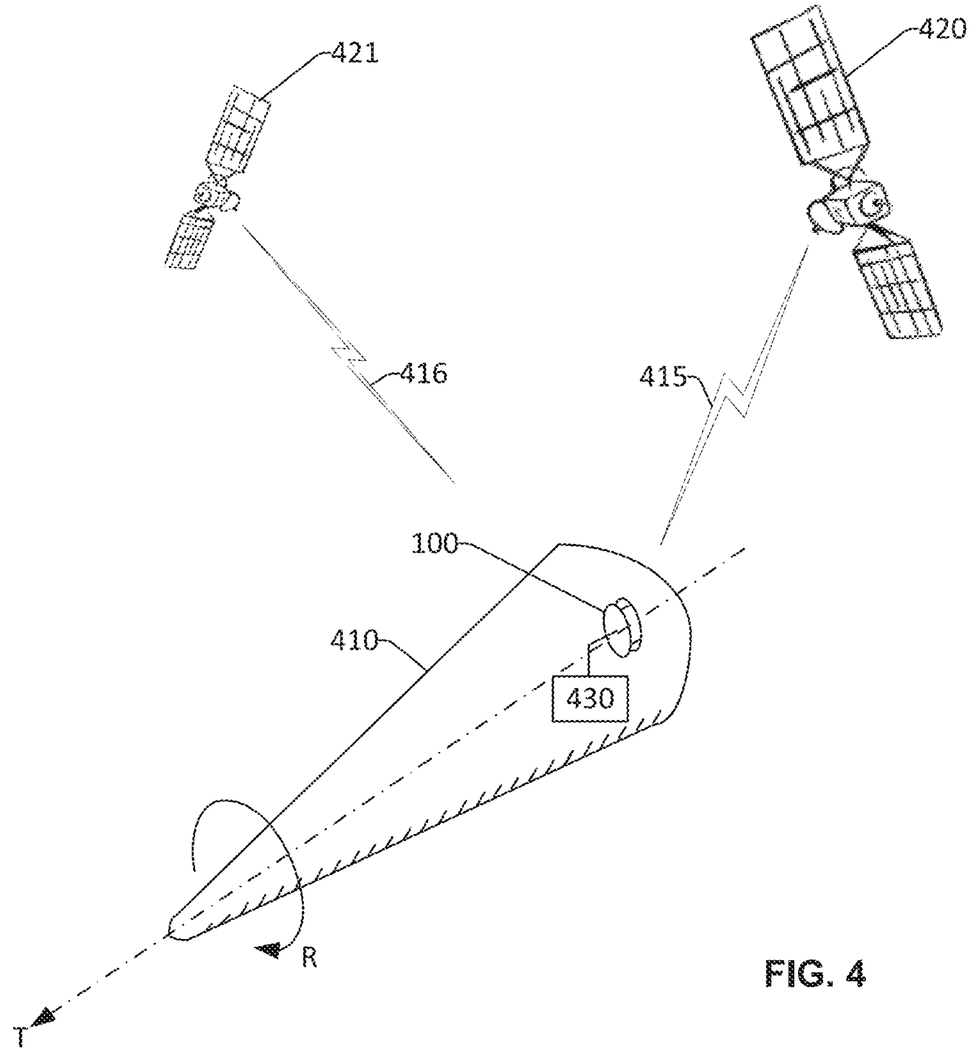
FIG. 4 is a schematic of the ring antenna located on a vehicle in flight and in communication with a plurality of GPS satellites.

Turning to FIG. 4, system 400 is presented, wherein system 400 includes a vehicle 410 traveling in a direction of travel T. The vehicle 410 can be an aircraft, a space craft, a projectile, a body, etc. Further, as the vehicle 410 is in motion, the vehicle 410 can be rotating about an axis of travel based upon the direction of travel T. As shown, the vehicle 410 has the antenna 100 onboard. In an example, the antenna 100 can be attached to a rear-facing portion of the vehicle 410 (e.g., to minimize exposure of the antenna 100 to conditions such as heat). Further, to maintain phase stability of the antenna 100 during operation (e.g., motion) of the vehicle 410, the antenna 100 can be located (e.g., mounted) on a centerline extending through the vehicle 410. For example, the centerline of the vehicle 410 can be the axis of travel in direction T, as indicated.

The system 400 also includes satellites 420 and 421 that are shown as emitting signals 415 and 416, respectively. The satellites 420 and 421 can be operating as part of a navigation system, where a minimum number of satellites are required for positioning of a vehicle (e.g., vehicle 410). For example, signaling from four or more satellites is required for GPS positioning. The antenna 100 is illustrated as receiving the signals 415 and/or from the satellites 420 and 421. As the signals 415 and 416 are received at the antenna 100, a GPS receiver 430 located onboard the vehicle 410 can determine a location of the vehicle 410 based upon the signals 415 and/or 416. Accordingly, the GPS receiver 430 can be operating in conjunction with a navigation system (not shown) located on the vehicle 410, whereby the navigation system can utilize the GPS information to enable steering of the vehicle 410, etc. During operation, the antenna 100 can protected from environmental conditions experienced during flight of the vehicle by covering the antenna 100 with a cover comprising any suitable material (e.g., having a low thermal conductivity), e.g., a fused-silica cover.

Figure 6:
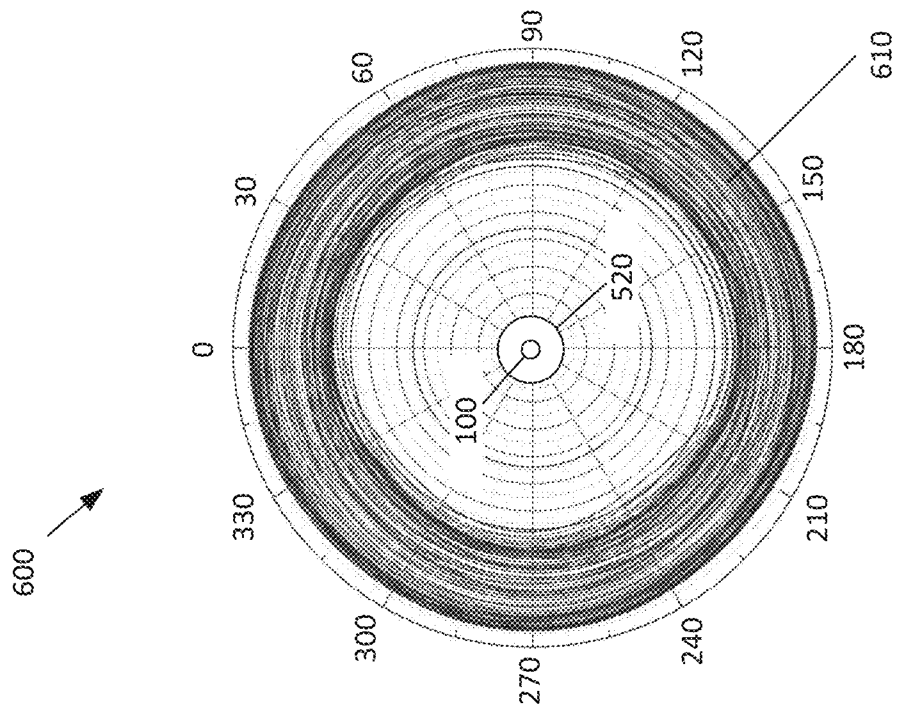
FIG. 6 is a plot of roll angle versus gain for an exemplary ring antenna.
Figure 5:
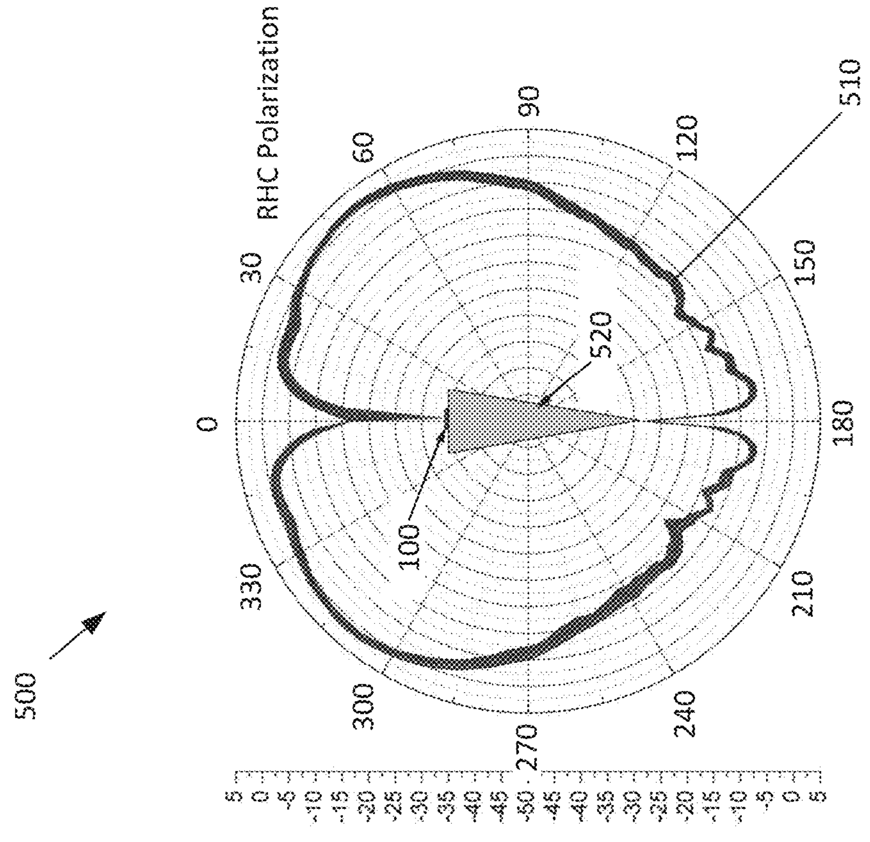
FIG. 5 is a plot of azimuth angle versus gain for an exemplary ring antenna.

FIG. 5 presents a plot 500 of azimuth angle (degrees) versus gain (decibels isotropic circular (dBic)), while FIG. 6 presents a plot 600 of roll angle (degrees) versus gain (dBic). The antenna 100 is located on a support structure 520. As shown by plots 510 and 610, a minimal or null signal is measured at the front, forward direction. However, as the measurements are conducted at the edge of the antenna 100, a high degree of electrical energy is radiating from the edge of the antenna 100, and further, the electrical field has a radiated phase that is consistent and unvarying.

Measured electromagnetic characteristics of the antenna 100, per FIGS. 5 and 6, include operating bandwidth (voltage standing wave ratio (VSWR)</=2:1) at L-Band, 35% bandwidth which includes both L1 and L2 frequency Bands. The antenna 100 can be utilized for both circular and linear polarization. The antenna 100 has an omnidirectional radiation pattern with peak gains at 10 to 20 degrees off axis, with minimal to no phase variation about its axis.

Figure 7:
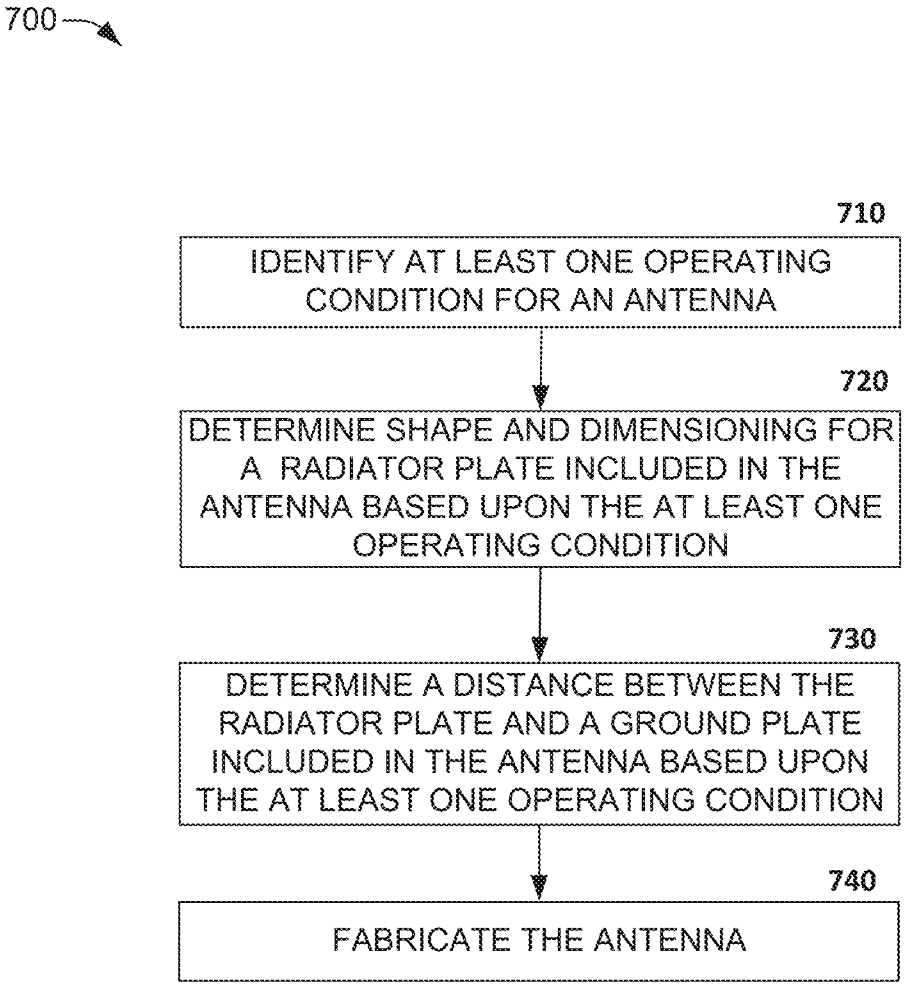
FIG. 7 is a flow diagram illustrating an exemplary methodology for fabricating a ring antenna.
Figure 8:
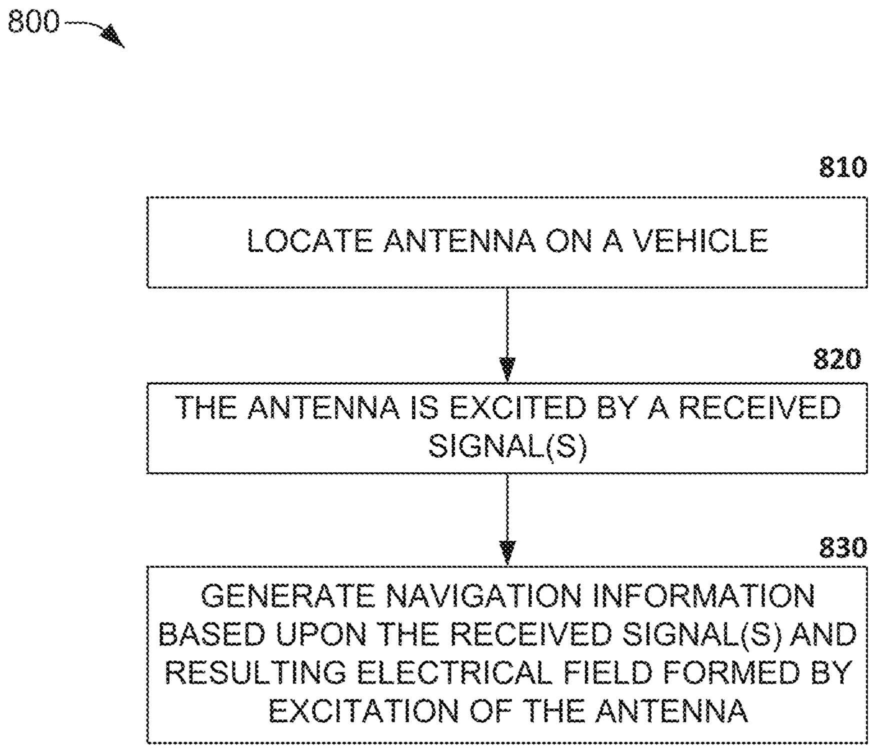
FIG. 8 is a flow diagram illustrating an exemplary methodology for operating a ring antenna

FIGS. 7 and 8 illustrate exemplary methodologies relating to fabrication and operation of an antenna having an omnidirectional electrical field of constant phase. While the methodologies are shown and described as being a series of acts that are performed in a sequence, it is to be understood and appreciated that the methodologies are is not limited by the order of the sequence. For example, some acts can occur in a different order than what is described herein. In addition, an act can occur concurrently with another act. Further, in some instances, not all acts may be required to implement the methodologies described herein.

FIG. 7 illustrates a methodology 700 for constructing and operating an antenna, where the antenna has an omnidirectional electric field having a constant phase. At 710, an operating frequency for the antenna system is identified. For example, the antenna can be for application in a GPS-based navigation system, and accordingly, the antenna can be required to operate at GPS L1 frequency or both GPS L1 and GPS L2 frequencies.

At 720, shape and dimensioning of the antenna can be determined. As previously described, the antenna design can comprise of pair of plates and a central conductor. The pair of plates can comprise a lower plate, wherein the lower plate is a ground plate and has a hole located at the center of the lower plate, and an upper plate, wherein the upper plate is aligned parallel to the lower plate and can function as a radiator plate. The upper plate can comprise an outer ring having a centerpoint located over the hole of the lower plate, and a plurality of inner rings, wherein the plurality of inner rings are contained within and are symmetrically arranged about the centerpoint of the outer ring. The plurality of inner rings are interlocked and connect to each other at the centerpoint of the outer ring, and are attached to the outer ring. The antenna can further include a conductive cone attached to the plurality of the inner rings, wherein attachment is such that the base of the conductive cone is located at the centerpoint of the outer ring and the apex of the conductive cone is located over the hole in the lower plate. The upper and lower plates can be joined (and also gapped) by a plurality of posts, wherein the plurality of posts are located between the lower plate and the upper plate, and are positioned around the outer ring with an even spacing between neighboring posts in the plurality of posts. A connector can be incorporated into the antenna design to enable connection of a conductive cable (e.g., coax cable) to the antenna, and accordingly connection of the antenna to a GPS receiver. Determining the shape and dimensioning of the antenna can include material selection, determining number and arrangement of shapes comprising the upper plate, etc.

At 730, as previously mentioned, the antenna design can include separating the upper plate from the lower plate. The separation distance, in conjunction with upper plate design, material selection, etc., can affect operational parameters such as operational bandwidth, impedance, operational frequency, etc. Accordingly, a separation distance between the radiator plate and the ground plate can be determined to achieve a required operational parameter(s).

At 740, the antenna system can be fabricated based upon the determined dimensioning, separation distance, material selection, etc.

FIG. 8 illustrates a methodology 800 for operation of an antenna, where the antenna has an omnidirectional electric field having a constant phase. At 810, the antenna can be attached to (e.g., incorporated into) vehicle, wherein the vehicle can undergo high velocity flight, and further, during flight, the vehicle can undergo rotation about its axis of travel. Rotation of the vehicle can accordingly cause the antenna to rotate about the direction of travel of the vehicle. The antenna can be connected to a receiver co-located on the vehicle.

At 820, during operation of the vehicle, the antenna can be excited such that an electrical field is established around the antenna. The antenna can be excited by a signal (e.g., a GPS signal received in free space from a satellite) that is incident upon the antenna, wherein the signal can comprise of electromagnetic energy. Excitation of the antenna can cause an electric field (e.g., an electric current field) to be generated at the antenna, wherein a magnitude and duration of the electric field can be based upon a magnitude and size of each of the incident signals.

At 830, the signals, and according electrical fields produced at the antenna, can be received and monitored by the co-located receiver, from which GPS-related info can be obtained (e.g., by the GPS receiver and any associated equipment) to generate navigation information regarding a current, previous, and/or future location of the vehicle. Accordingly, a navigation system can utilize the navigation information to adjust a bearing, direction, flight path, etc. Phase variation in any of the received signals can be caused by any discontinuity, e.g., a non-smooth surface in the ground plane that the antenna is mounted to. Also changes in the antenna impedance can result from changes in environmental conditions can affect the phase of the signal being received.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. An antenna, comprising:

a lower plate, wherein the lower plate is a ground plate and has a hole located at the center of the lower plate;

an upper plate, wherein the upper plate is aligned parallel to the lower plate, and the upper plate comprises:

an outer ring having a centerpoint located over the hole of the lower plate; and a plurality of inner rings, wherein the plurality of inner rings are contained within and are symmetrically arranged about the centerpoint of the outer ring, the plurality of inner rings are interlocked and connect to each other at the centerpoint of the outer ring, and are attached to the outer ring;

a conductive cone attached to the plurality of the inner rings, wherein attachment is such that the base of the conductive cone is located at the centerpoint of the outer ring and the apex of the conductive cone is located over the hole in the lower plate; and a plurality of posts connecting the upper plate to the lower plate, wherein the plurality of posts are located between the lower plate and the upper plate, and are positioned around the outer ring with an even spacing therebetween.

2. The antenna of claim 1, further comprising a connector located on the lower plate, the connector configured to connect to a coaxial cable, the coaxial cable comprising an inner core conductor, a tubular insulator around the inner core, a tubular conducting shield around the tubular insulator, wherein the conducting shield is connected to the lower plate, the core conductor is located in the hole of the lower plate and connects to the apex of the conductive cone.

3. The antenna of claim 1, wherein the lower plate, the upper plate, the cone and the plurality of posts are formed from conductive material.

4. The antenna of claim 1, wherein the outer ring of the upper plate has a diameter of about five inches.

5. The antenna of claim 1, wherein the upper plate and the lower plate are separated by about 0.25 inches.

6. The antenna of claim 1, wherein the apex of the cone is located about 0.05 inches above the hole.

7. The antenna of claim 1, wherein the plurality of rings comprises four rings, the four rings are arranged in a cross arrangement with 900 between a first ring and a neighboring ring.

8. The antenna of claim 1, wherein the plurality of posts comprise four posts, the four posts are arranged at 90° to each other around the outer ring.

9. The antenna of claim 1, wherein the antenna is attached to a body having rotational motion, the rotational motion of the body is along an axis, the antenna is aligned such that the rotational axis extends through the hole and the centerpoint of the outer ring.

10. The antenna of claim 9, wherein the lower plate is attached to the body.

11. The antenna of claim 1, wherein the antenna is attached to a global positioning system (GPS).

12. The antenna of claim 11, wherein the antenna is configured to be sensitive to at least one of GPS L signaling and GPS L2 signaling.

13. The antenna of claim 1, wherein the upper plate is formed by at least one of machining, electrical discharge machining, casting, welding, soldering, or brazing.

14. A method, comprising:

detecting, with an antenna, a global positioning system (GPS) signal, wherein the antenna comprises:

a lower plate, wherein the lower plate has a hole located at the center of the lower plate;

an upper plate, wherein the upper plate is aligned parallel to the lower plate, and the upper plate comprises:

an outer ring having a centerpoint located over the hole of the lower plate; and a plurality of inner rings, wherein the plurality of inner rings are contained within the outer ring and are symmetrically arranged about the centerpoint of the outer ring, the plurality of inner rings are interlocked and connect to each other at the centerpoint of the outer ring, and the plurality of inner rings are attached to the outer ring;

a conductive cone attached to the plurality of the inner rings, wherein attachment is such that the base of the conductive cone is located at the centerpoint of the outer ring and the apex of the conductive cone is located over the hole in the lower plate; and a plurality of posts connecting the upper plate to the lower plate, wherein the plurality of posts are located between the lower plate and the upper plate, and are positioned around the outer ring with an even spacing between neighboring posts in the plurality of posts.

15. The method of claim 14, wherein the GPS signal is a L1 or a L2 signal.

16. The method of claim 14, wherein the antenna is attached to a vehicle having rotation about a central axis of the vehicle and the vehicle is travelling at hypersonic velocity.

17. The method of claim 14, wherein an omnidirectional electrical field is generated at the antenna by electromagnetic energy forming the GPS signal, an electrical charge flows through the upper plate to the lower plate causing the electrical field to be generated.

18. The method of claim 17, wherein, during rotation of the body, the antenna has a constant phase.

19. A method, comprising:

detecting an electrical field being generated at an antenna, wherein the antenna is located on a rotating body, the electrical field results from an electromagnetic signal impinging upon the antenna, the antenna comprising:

a grounding plate, wherein the grounding plate is circular and a hole located at the center of the grounding plate;

a top plate, wherein the top plate is aligned parallel to the lower plate, and the upper plate comprises:

an outer ring having a centerpoint located over the hole of the lower plate; and a plurality of inner rings, wherein the plurality of inner rings are inside and symmetrically arranged about the centerpoint of the outer ring, the plurality of inner rings are attached to the outer ring and connect to each other at the centerpoint of the outer ring;

a conductive cone attached to the plurality of inner rings, wherein attachment is such that the base of the conductive cone is located at the centerpoint of the outer ring and the apex of the conductive cone is located over the hole in the grounding plate; and a plurality of posts connecting the top plate to the grounding plate, the plurality of posts maintaining parallel separation between the top plate and the grounding plate.

20. The method of claim 19, wherein the signal is a signal from a global positioning system (GPS), and the signal is a GPS L1 frequency signal alone or in combination with a GPS L2 frequency signal.

* * * * *